(12) United States Patent
Huotari et al.

(10) Patent No.: US 7,832,973 B2
(45) Date of Patent: Nov. 16, 2010

(54) OPERATING DEVICE FOR CREATING MOVEMENT IN TWO DIFFERENT DEVICES WITH THE AID OF A SINGLE OPERATING LEVER

(75) Inventors: Henri Huotari, Espoo (FI); Iisakki Huotari, Espoo (FI); Jaakko Huotari, Espoo (FI); Lauri Huotari, Espoo (FI); Markku Siikamaki, Espoo (FI)

(73) Assignee: Maping Kommandiittiyhtiö (FI)

( * ) Notice: Subject to any disclaimer, the term of this patent is extended or adjusted under 35 U.S.C. 154(b) by 1721 days.

(21) Appl. No.: 10/503,841

(22) PCT Filed: Feb. 4, 2003

(86) PCT No.: PCT/FI03/00088

§ 371 (c)(1),
(2), (4) Date: Aug. 6, 2004

(87) PCT Pub. No.: WO03/066342

PCT Pub. Date: Aug. 14, 2003

(65) Prior Publication Data

US 2005/0081658 A1    Apr. 21, 2005

(30) Foreign Application Priority Data

Feb. 6, 2002    (FI) .................................. 20020240

(51) Int. Cl.
*B42C 9/00* (2006.01)
(52) U.S. Cl. .......................................... 412/29; 412/33
(58) Field of Classification Search .................. 74/491, 74/665 G, 665 GA, 523; 412/6, 20, 22, 29, 412/33, 37
See application file for complete search history.

(56) References Cited

U.S. PATENT DOCUMENTS

| 5,013,200 A | 5/1991 | Hunder et al. |
| 5,306,047 A * | 4/1994 | Otake et al. .................... 412/37 |
| 6,341,772 B1 | 1/2002 | Waragai et al. |

FOREIGN PATENT DOCUMENTS

| DE | 31 36 376 A1 | 5/1983 |
| DE | 36 39 795 A1 | 6/1988 |

\* cited by examiner

*Primary Examiner*—William C Joyce
(74) *Attorney, Agent, or Firm*—Skinner and Associate

(57) ABSTRACT

An operating device in an application, in which movement in two different devices can be created using a single operating lever (9), the device being based on the rotation of sprockets. A sprocket (11) attached to the shaft (10) of the operating lever (9) is equipped on only part of its circumference with teeth that engage with the adjacent sprockets (13, 15). The operating device is mainly intended to move the press carrier and sidenipping device of a glue-binding device (1).

6 Claims, 3 Drawing Sheets

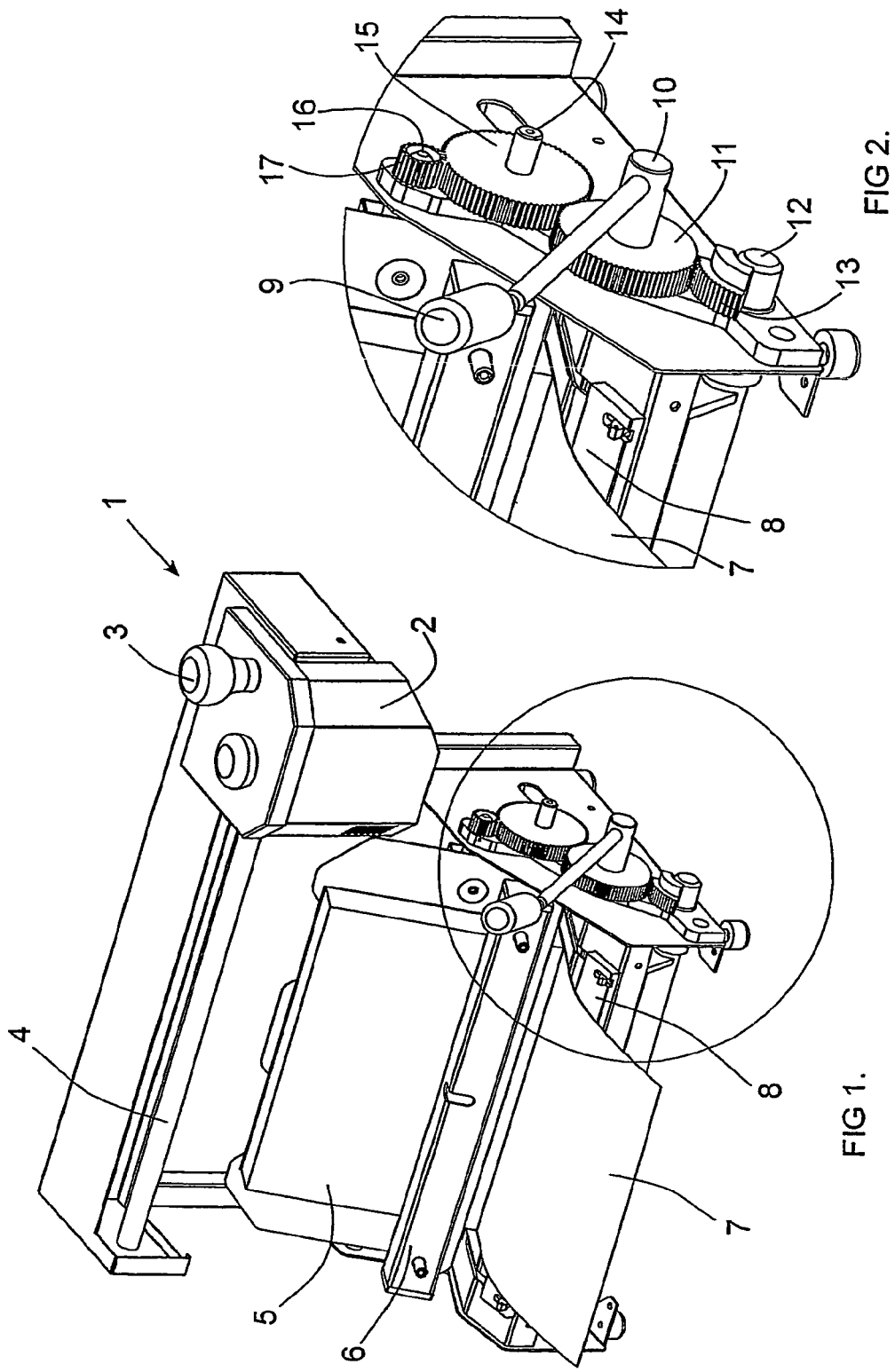

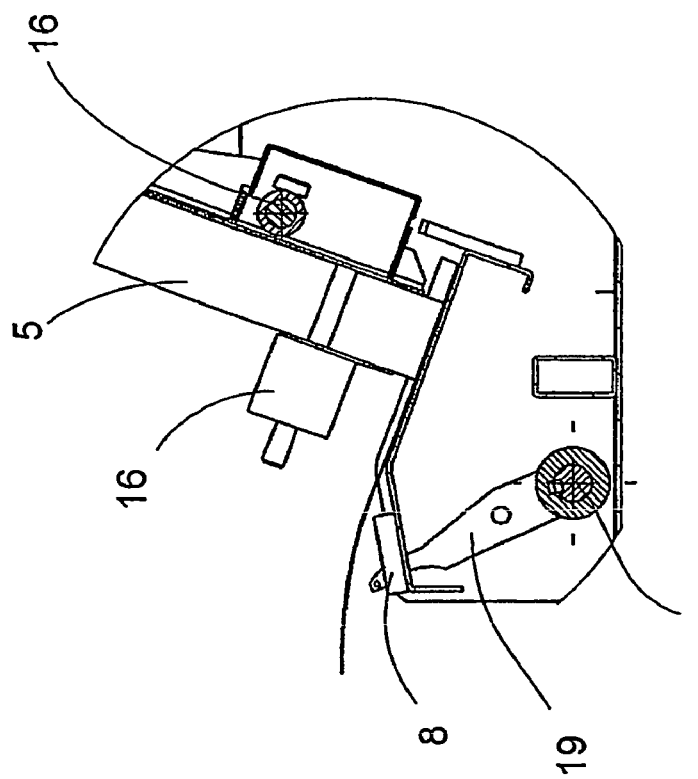
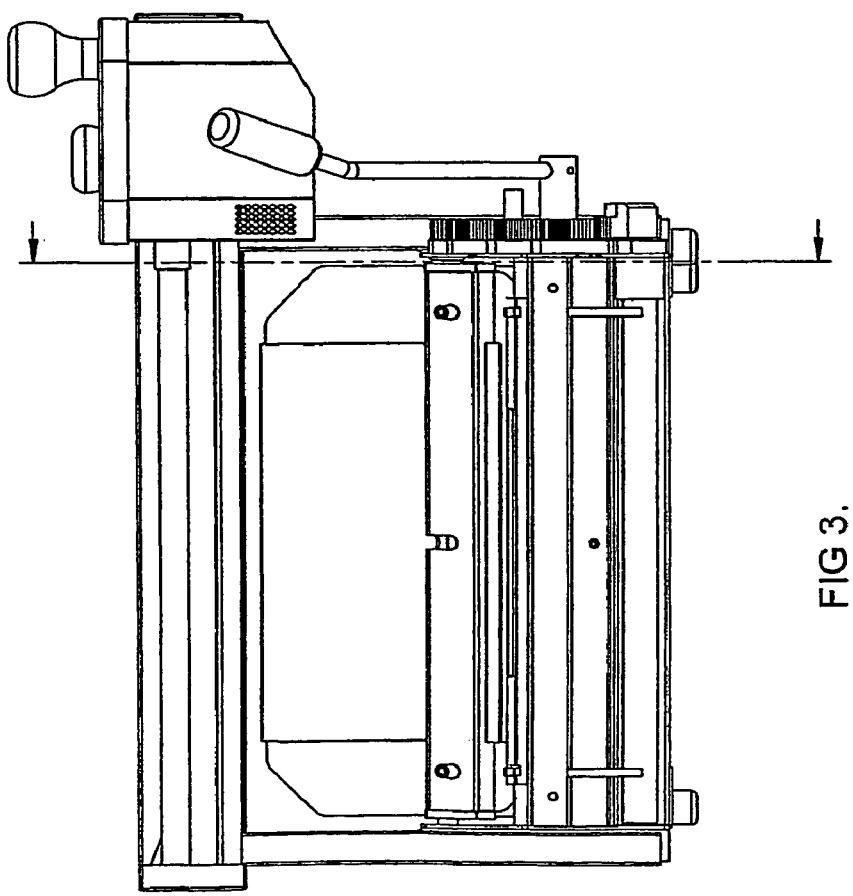
FIG 4.
FIG 3.

OPERATING DEVICE FOR CREATING MOVEMENT IN TWO DIFFERENT DEVICES WITH THE AID OF A SINGLE OPERATING LEVER

The present invention relates to an operating device and particularly to an operating device intended to create movement in two directions from two starting points, using one and the same handle or similar operating lever.

Numerous mechanical devices are known, in which there are at least two components, to which force must be applied, in order to move them. This publication discloses one such device, i.e. a glue-binding device, but it is in no way intended to be limited to a device like that described, but to clearly present the operating principle of the device.

In glue-binding, two separate levers are generally used to operate different functions. The most important of these functions are holding the paper bundle to be glue-bound securely in place while the spine of the bundle is being processed. In this case, processing refers to spreading the glue on the spine of the bundle and possibly also to roughening the spine prior to spreading the glue. This takes place suitably by using a press component, in which there are usually two plate-like parts, between which the bundle is pressed, especially in a manner that will keep the bundle under compression without the pressure having to be maintained by pushing the lever the whole time.

The second work stage, in which a lever is again required, is side nipping. This means that the cover sheet to be placed on top of the glue-bound bundle is given its final shape and attached to the sides of the bundle by a narrow band of glue next to the spine. This usually takes place by pushing a lever to move a suitable press beam or similar counter-piece from the side against the area next to the spine of the bundle being glue-bound.

BRIEF SUMMARY OF THE INVENTION

As stated, operation using two levers is, as such, possible, but the use of the present invention allows one of the levers to be eliminated, giving simpler and easier operation while also making the device simpler and cheaper to construct.

The aforementioned and other advantages and benefits of the invention are achieved by means of a device, the characteristic features of which are stated in the accompanying Claims.

BRIEF DESCRIPTION OF THE DRAWINGS

In the following, the invention is examined in greater detail, in connection with a glue-binding device, with reference to the accompanying drawings, which show the invention applied, to its operating environment.

Thus

FIG. 1 shows an axonometric view of the glue-binding device;

FIG. 2 shows an enlarged partial view of the end of the said device;

FIG. 3 shows in turn the said device, seen from directly in front;

FIG. 4 shows a cross-section A-A of FIG. 3; and

DETAILED DESCRIPTION OF THE INVENTION

Figure 5:
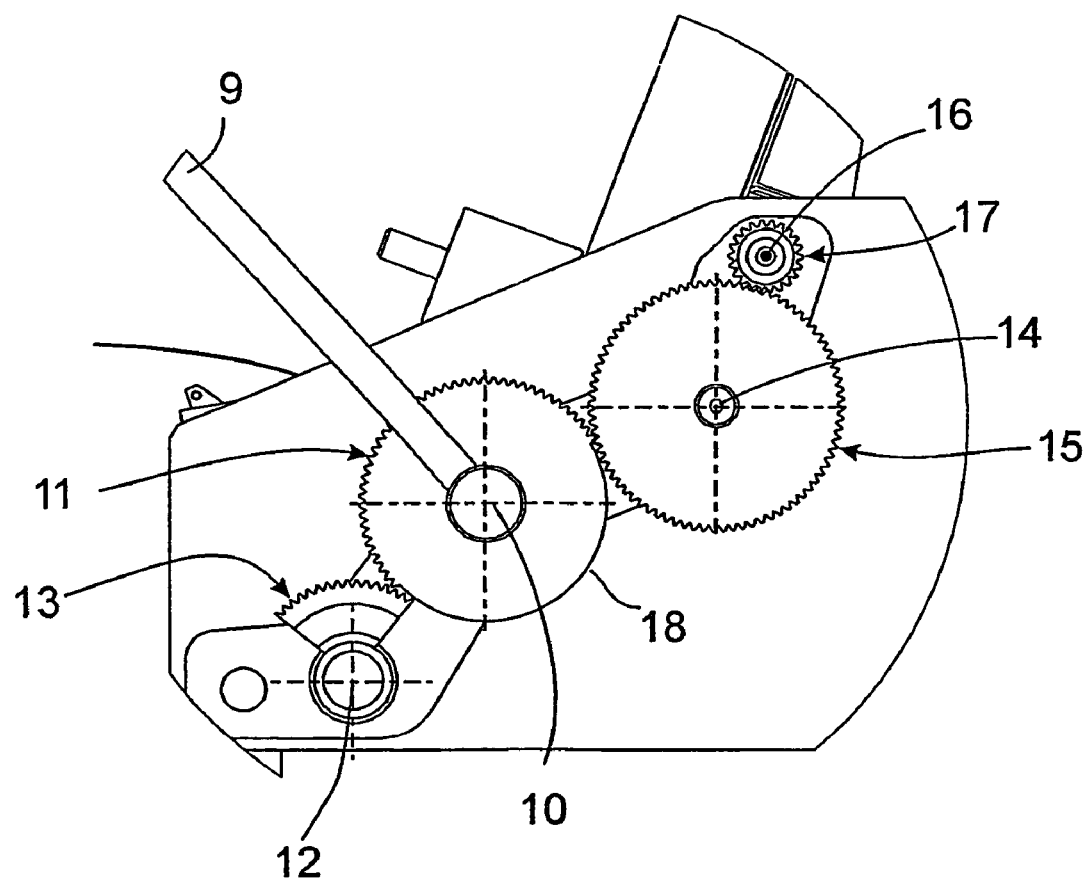
FIG. 5 shows a closer view of the basic idea of the invention.

FIG. 1 thus shows a glue-binding device, which has the following principal components. The device 1 comprises a glue-spreading unit 2, which can be moved backwards and forwards along a slide rail 4 in the frame and which is suitably supported in the spreading position. The movement can take place, for example, manually by using a knob 3. The bundle 5 of paper or similar is pressed in a press unit, which can be rotated around its shaft and which is shown in FIG. 1 in a position turned away from the original gluing position. The paper bundle 5 is held in place with the aid of a press beam 6. In the position shown, the glued spine is downwards and the bundle is ready for side nipping. The cover sheet of the bundle 5 is marked with the reference number 7 and the beam performing the side nipping with the reference number 8. It should be noted, however, that the invention is naturally not suitable for glue-binding, in which a cover 7 is not used at all.

FIG. 2 shows an enlarged view of part of FIG. 1. It shows the details of the operation of the device with the aid of a lever 9. The shaft 10 of the lever 9 is pivoted in the frame structure and has a drive sprocket 11—to be examined in detail later— attached to it. The mechanism moving the side-nipping beam 8 includes a sprocket segment 13. The press carrier is rotated in turn using the lever 9 to drive the sprocket 15 set on the shaft 14, which then drives the sprocket 17 set on the shaft 16. The shaft 16 turns the carrier.

FIG. 3 shows a front view of the device. The cross-section A-A is marked on the figure and is shown in FIGURE 4. However, before describing FIG. 4, the principle of the invention is examined with the aid of FIG. 5.

FIG. 5 thus shows the mutual locations and operation of the operating lever and the sprockets in greater detail. The reference numbers refer to the same things as in FIGS. 1 and 2. The only new reference number is 18.

Thus, as can be seen from FIG. 5, the drive sprocket 11 attached to the lever 9 and its shaft 10 does not have a complete set of teeth. The part of the sprocket 11 marked with the reference number 18 is without teeth. So what happens, when it is wished to rotate the press carrier around its shaft 16? In that case, the lever 9 is turned clockwise in FIG. 5. If the operator is assumed to be standing on the left-hand side of the device in FIG. 5, he simply pushes the lever 9 away from him. The teeth of the sprocket 11 then engage with the teeth of the sprocket 15, causing the sprocket 15 to rotate and thus the sprocket 17 to rotate, according to known principles, so that the carrier, which is attached to the shaft 16 of the sprocket 17, rotates with it. The sprocket 13, on the other hand, does not begin to rotate, because the sprocket 11 lacks the teeth that would make it rotate.

The rotation takes place, as can be clearly seen from the direction of rotation of the sprockets, in such a way that, in the position shown in FIG. 1, in which the paper and cover sheet are loaded in place and pressed in place by the beam 6, the bundle is rotated to allow its spine to be spread with the aid of the spreading devices 2, 3, 4. After the glue has been spread, the lever is pulled back to its original position, i.e. the position of FIG. 1, in which side nipping is carried out.

When it is wished to carry out side nipping, the lever 9 is pulled towards the operator, in which case the sprocket 15 will not begin rotate, as the sprocket 11 lacks the necessary teeth 18, but the sprocket segment 13 begins to rotate along with the sprocket 11 as their teeth engage and the side-nipping beam moves, due to the effect of the lever system 19 shown in FIG. 4, onto the area next to the spine of, and against the side of the paper bundle being glued, thus performing pressing and the final stage of the gluing. After a short period of pressure, the lever is returned to its original position, when the side-nipping beam 8 also returns to its original position. The return can also be carried out, or assisted by a return spring. After this, the glued product is removed by opening the press beam. After this, a new bundle for gluing can be loaded in place.

As has become clear form the above, the invention simplifies, and is also certain to reduce the cost of the structures and make the glue-binding device extremely handy to operate. The device is also operationally reliable. It is obvious that the sprockets must be positioned quite precisely in relation to each other, because at the start only the desired sprocket must begin to move: moving the lever in one direction starts the sprocket 15 and moving the lever in the other direction starts the sprocket 13. This is, however, a basic adjustment, which is not changed later.

It is clear that, according to the direction or the angle of the rotation, one or more intermediate sprockets can be used, thus, as is known, causing a change in the direction of rotation of the following sprocket. Many other variations are possible, while remaining within the inventive idea and the scope of protection defined by the accompanying Claims.

For example, because, in the embodiment depicted above, only the part of the sprocket 11 with teeth is of importance, the sprocket can equally well be only a segment, in which case the sprocket will lack the entire segment corresponding to the part of the whole sprocket that has no teeth. Such alternatives are certainly also possible in which there are two sprockets, or two sprocket segments, or a sprocket and a segment, and would operate exactly like the single sprocket described above. In the case of two sprockets/segments, each tooth portion can be shorter than in the case of a single sprocket.

The invention claimed is:

1. A glue-binding operating device, in applications in which movement must be created in two different devices with the aid of a single operating lever, characterized in that at least one drive sprocket has teeth for engaging adjacent press carrier and side-nipping device sprockets over only a specific segment of the drive sprocket, and is attached to a shaft of the operating lever, and further characterized in that the operating device moves a press carrier and a side-nipping device.

2. An operating device according to claim 1, characterized in that the teeth of the drive sprocket extend to an area, in which the outermost teeth of the segment of the drive sprocket essentially engage with the teeth of the adjacent press carrier and side-nipping sprockets on either side of the drive sprocket.

3. An operating device according to claim 2, characterized in that the position of the outermost teeth of the drive sprocket in relation to the teeth of the adjacent press carrier and side-nipping sprockets is such that a contact transmitting power is created between the teeth of the drive sprocket and of the adjacent sprockets only by rotating the drive sprocket in one direction.

4. An operating device according to claim 3, characterized in that power transmitting contact between the drive sprocket and one adjacent sprocket arises when the drive sprocket is turned in the opposite direction to that creating contact between drive sprocket and the other adjacent sprocket.

5. An operating device according to claim 1, characterized in that the device has one sprocket, with teeth only in a specific segment.

6. An operating device according to claim 1, characterized in that the device drive sprocket has two sprocket segments, one of which is intended to engage with the side-nipping sprocket and the other with the press carrier sprocket.

* * * * *